US 8,425,375 B2

(12) United States Patent
Fukuda et al.

(10) Patent No.: US 8,425,375 B2
(45) Date of Patent: Apr. 23, 2013

(54) DRIVING DEVICE FOR HYBRID VEHICLE

(75) Inventors: Kenji Fukuda, Shioya-gun (JP);
Tetsurou Hamada, Utsunomiya (JP);
Yasuo Kitami, Higashimatsuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 1204 days.

(21) Appl. No.: 12/125,705

(22) Filed: May 22, 2008

(65) Prior Publication Data
US 2008/0318720 A1 Dec. 25, 2008

(30) Foreign Application Priority Data

May 25, 2007 (JP) ................................. 2007-139192

(51) Int. Cl.
*F16H 3/72* (2006.01)
*B60K 6/00* (2007.10)

(52) U.S. Cl.
USPC ............................... 477/5; 477/4; 180/65.235

(58) Field of Classification Search .............. 180/65.21, 180/65.23, 65.235; 477/3, 4; 475/5, 287
See application file for complete search history.

(56) References Cited

U.S. PATENT DOCUMENTS

| 5,577,973 A * | 11/1996 | Schmidt ........................ 475/5 |
| 5,904,631 A * | 5/1999 | Morisawa et al. ................ 475/5 |
| 5,909,720 A * | 6/1999 | Yamaoka et al. ........... 123/179.3 |
| 5,914,575 A * | 6/1999 | Sasaki ........................ 318/150 |
| 6,005,297 A * | 12/1999 | Sasaki et al. .................. 290/4 C |
| 6,524,217 B1* | 2/2003 | Murakami et al. ................ 477/5 |
| 6,558,289 B2* | 5/2003 | Chung ............................ 477/3 |
| 6,722,332 B2* | 4/2004 | Kojima ...................... 123/179.3 |
| 6,752,225 B2* | 6/2004 | Kojima ........................ 180/65.25 |
| 6,845,832 B2* | 1/2005 | Takizawa et al. ............. 180/53.8 |
| 7,004,868 B2* | 2/2006 | Oshidari et al. ................... 475/5 |
| 7,175,555 B2* | 2/2007 | Kozarekar et al. ................ 475/5 |
| 7,220,203 B2* | 5/2007 | Holmes et al. .................... 475/5 |
| 2004/0050597 A1* | 3/2004 | Ai et al. ....................... 180/65.2 |
| 2006/0011395 A1* | 1/2006 | Sugiyama et al. ............ 180/65.4 |
| 2007/0093341 A1* | 4/2007 | Supina et al. ..................... 475/5 |
| 2008/0302590 A1* | 12/2008 | Sato ............................. 180/242 |

FOREIGN PATENT DOCUMENTS

| JP | 7-135701 A | 5/1995 |
| JP | 11-198669 A | 7/1999 |
| JP | 2000-23310 A | 1/2000 |
| JP | 2000-156917 A | 6/2000 |
| JP | 2002-316542 A | 10/2002 |
| JP | 2004-114944 A | 4/2004 |
| JP | 2005-304205 A | 10/2005 |
| JP | 2006-131132 A | 5/2006 |

* cited by examiner

*Primary Examiner* — J. Allen Shriver, II
*Assistant Examiner* — Bridget Avery
(74) *Attorney, Agent, or Firm* — Arent Fox LLP

(57) ABSTRACT

A driving device for a hybrid vehicle including: an engine; an electric motor; a power combination/distribution mechanism which is disposed between both the engine and the electric motor and one pair of front wheels and rear wheels so as to combine and distribute power generated from the engine and the electric motor; and a transmission mechanism which is disposed between the engine and the other pair of the front wheels and the rear wheels, wherein the power combination/distribution mechanism is a planetary gear mechanism having a sun gear, a carrier, and a ring gear; an output shaft of the electric motor is connected to the carrier; and wherein rotational driving ranges in the electric motor are set to each of a normal rotation direction and a reverse rotation direction.

8 Claims, 15 Drawing Sheets

DRIVING DEVICE FOR HYBRID VEHICLE

BACKGROUND OF THE INVENTION

Priority is claimed on Japanese Patent Application No. 2007-139192, filed on May 25, 2007, the content of which is incorporated herein by reference.

FIELD OF THE INVENTION

The present invention relates to a driving device for a hybrid vehicle.

DESCRIPTION OF RELATED ART

A hybrid vehicle has been proposed in which an engine and an electric motor (motor) are used as a driving source (for instance, see Japanese Unexamined Patent Application, First Publication No. 2004-114944).

FIGS. 15A and 15B are schematic configuration diagrams illustrating the hybrid vehicle disclosed in the above publication. In the hybrid vehicle, output generated from an engine 110 and a first motor 120 are input to a transmission mechanism (T/M) 140. An output generated from the transmission mechanism 140 is input to a power distribution mechanism 150 including a planetary gear mechanism (planetary). A driving force input to the power distribution mechanism 150 is distributed to front wheels 130 and rear wheels 160. The driving force is transmitted to the rear wheels 160 through a second motor 125. With such a configuration, the length of a power transmission member for transmitting a power of the power distribution mechanism 150 to the front wheels 130 can be made short in the longitudinal direction of the vehicle.

In a constant-speed (cruise) traveling mode, it is generally desirable to use only an engine as a driving source in a state in which a motor is stopped from the viewpoint of improvement of fuel efficiency.

However, according to the known technique described above, outputs generated from the engine 110 and the first motor 120 are combined by the transmission mechanism 140. For this reason, in order to carry out a transmission action in the transmission mechanism 140, it is necessary to drive the first motor 120 as well as the engine 110. For this reason, there arises a problem in that the improvement of fuel efficiency is limited.

Therefore, an object of the invention is to provide a new driving device for a hybrid vehicle capable of improving fuel efficiency.

SUMMARY OF THE INVENTION

In order to achieve the above-described object, the invention employs the followings. Namely, the present invention employs a driving device for a hybrid vehicle including: an engine; an electric motor; a power combination/distribution mechanism which is disposed between both the engine and the electric motor and one pair of front wheels and rear wheels so as to combine and distribute power generated from the engine and the electric motor; and a transmission mechanism which is disposed between the engine and the other pair of the front wheels and the rear wheels, wherein the power combination/distribution mechanism is a planetary gear mechanism having a sun gear, a carrier, and a ring gear; an output shaft of the electric motor is connected to the carrier; and wherein rotational driving ranges in the electric motor are set to each of a normal rotation direction and a reverse rotation direction.

According to the above driving device for the hybrid vehicle, it is possible to carry out a constant-speed (cruise) traveling mode in such a manner that a driving force generated from the engine is output to one pair of the front vehicle wheels and the rear vehicle wheels without outputting a driving force from the electric motor since the power combination/distribution mechanism is provided between both the engine and the electric motor and the pair of the vehicle wheels.

Also, it is not necessary to drive the electric motor for a transmission operation since the transmission mechanism is provided between both the engine and the other pair of the front wheels and the rear wheels. Accordingly, it is possible to reduce the power consumption of the electric motor, thereby improving fuel efficiency.

Further, it is possible to allow the vehicle to start and travel just by using the driving force generated from the electric motor in a state in which the engine is stopped (EV starting mode and EV traveling mode), thereby improving fuel efficiency.

Furthermore, it is possible to start the engine by increasing the rpm of the electric motor connected to the carrier in a state in which the EV traveling mode is carried out just by using a driving force generated from the electric motor. Accordingly, it is possible to switch the EV traveling mode to the engine traveling mode, thereby improving fuel efficiency.

In addition, the present invention also employs a driving device for a hybrid vehicle including: an engine; an electric motor; a power combination/distribution mechanism which is disposed between both the engine and the electric motor and one of a pair of front wheels and a pair of rear wheels so as to combine and distribute power generated from the engine and the electric motor; and a transmission mechanism which is disposed between the engine and the other pair of the front wheels and the rear wheels, wherein the power combination/distribution mechanism is a planetary gear mechanism having a sun gear, a carrier, and a ring gear; an output shaft of the engine is connected to the carrier; and wherein rotational driving ranges in the electric motor are set to each of a normal rotation direction and a reverse rotation direction.

According to the above driving device for the hybrid vehicle, it is possible to broadly distribute a driving force to front wheels or rear wheels by increasing or decreasing the rpm of the electric motor in a state in which the rpm of the engine connected to the carrier is maintained.

It may be arranged such that the driving device for the hybrid vehicle further includes an engine reverse rotation preventing mechanism which is disposed on a power transmission path of the engine so as to be closer to the engine than the power combination/distribution mechanism.

In this case, it is possible to prevent reverse rotation of the engine due to an output from the planetary gear mechanism.

It may be arranged such that the engine and the electric motor are disposed on the same axis.

In this case, it is possible to save space.

It may be arranged such that the driving device further includes a controller which controls an operation of the vehicle, wherein the controller controls the engine to be stopped and then controls the electric motor to generate a driving force so as to perform an electrically-driven travel operation of the vehicle.

In this case, it is possible to carry out the EV traveling mode just by using a driving force generated from the electric motor, thereby improving fuel efficiency.

It may be arranged such that the controller controls the electric motor to increase an rpm of the engine to a predetermined value or more to start the engine, in a case that a traveling resistance in rotating the one pair of the front wheels and the rear wheels with the electric motor through the power combination/distribution mechanism during the electrically-driven travel operation of the vehicle is larger than a starting resistance in starting the engine with the electric motor.

In this case, it is possible to use a driving force generated from the electric motor for starting the engine without outputting the driving force to one pair of the front wheels and the rear wheels when the traveling resistance is larger than the starting resistance of the engine, thereby improving fuel efficiency.

It may be arranged such that the driving device for the hybrid vehicle further includes an output shaft rotation braking unit which stops a rotation of an output shaft of the engine, wherein the controller controls the output shaft rotation braking unit to stop the rotation of the output shaft of the engine during the electrically-driven travel of the vehicle.

In this case, it is possible to prevent the following rotation of the engine in a state in which the EV traveling mode is carried out just by using a driving force generated from the electric motor, and thus it is possible to restrict the power consumption of the electric motor, thereby improving fuel efficiency.

It may be arranged such that the driving device for the hybrid vehicle further includes a second electric motor which is disposed on the output shaft of the engine and is disposed between the engine and the power combination/distribution mechanism so as to assist an output of the engine or to start the engine.

In this case, it is possible to freely start the engine or to assist an output of the engine. In particular, even when the traveling resistance of the vehicle is smaller than the starting resistance of the engine, it is possible to start the engine.

It may be arranged such that the driving device for the hybrid vehicle further includes: a controller which controls an operation of the vehicle; and a vehicle braking unit which is provided in the front wheels and the rear wheels, respectively, wherein the controller controls the vehicle braking unit to apply a braking force to the front wheels and the rear wheels while the vehicle is stopped, and then controls the electric motor to increase an rpm of the engine so as to start the engine.

In this case, it is possible to use a driving force generated from the electric motor for starting the engine without outputting the driving force to one pair of the front wheels and the rear wheels, thereby improving fuel efficiency.

It may be arranged such that the driving device for the hybrid vehicle further includes a controller which controls an operation of the vehicle, wherein the controller controls the electric motor to be stopped or to output zero torque and outputs a driving force generated from the engine to the other pair of the front wheels and the rear wheels through the transmission mechanism while the vehicle travels at a constant speed.

In this case, it is possible to carry out a constant-speed (cruise) traveling mode while restricting the power consumption of the electric motor, thereby improving fuel efficiency.

DETAILED DESCRIPTION OF THE INVENTION

Hereinafter, exemplary embodiments of the present invention will be described with reference to the drawings.

Figure 1A:
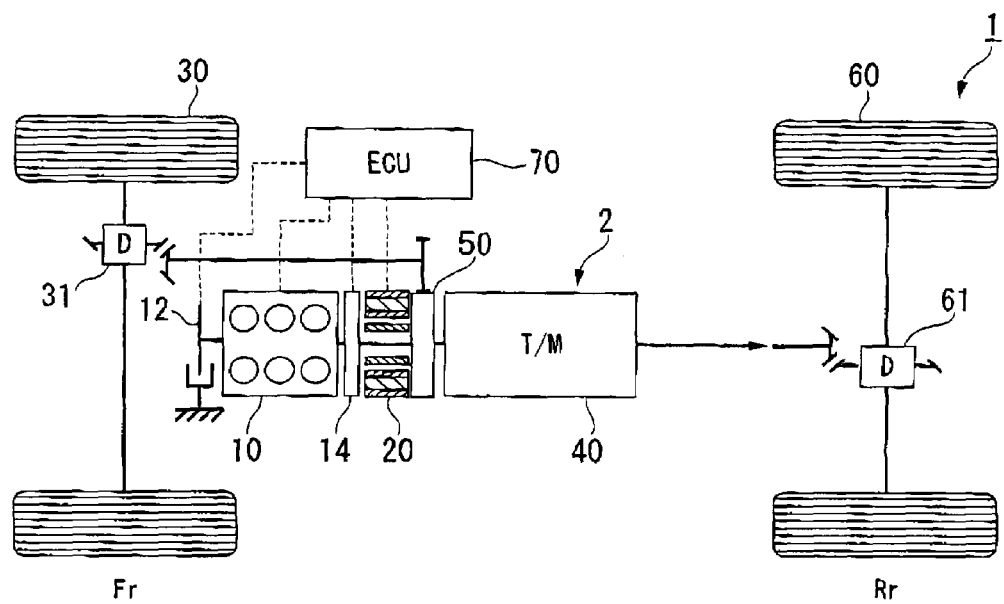
FIGS. 1A and 1B are explanatory views illustrating a driving device for a hybrid vehicle according to the present invention.
Figure 1B:
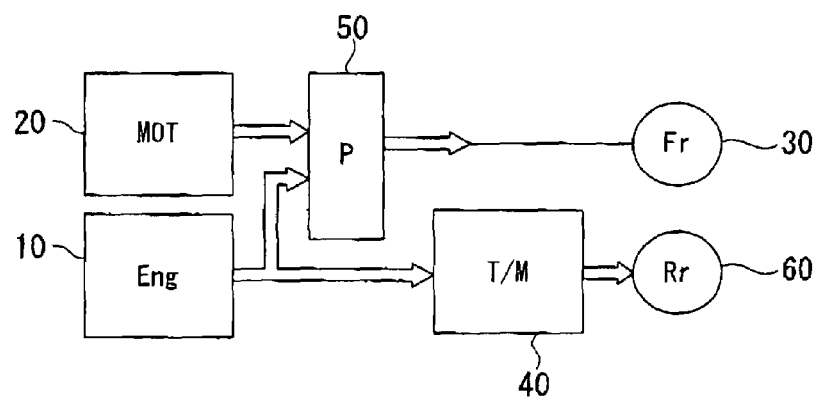

FIGS. 1A and 1B are explanatory views illustrating a driving device for a hybrid vehicle according to the present invention, in which FIG. 1A is a schematic configuration diagram and FIG. 1B is a block diagram. As shown in FIGS. 1A and 1B, a driving device 2 for a hybrid vehicle 1 according to the present invention includes an engine 10 and an electric motor (driving motor) 20 as driving sources. The engine 10 and the driving motor 20 (hereinafter, simply referred to as 'motor') are disposed on the same axis, thereby saving space. Rotational driving ranges in the motor 20 are set to both directions of rotation, that is, a normal rotation and a reverse rotation.

Driving forces generated from the engine 10 and the motor 20 are input to a power combination/distribution mechanism including a planetary gear mechanism (planetary) 50.

Figure 2:
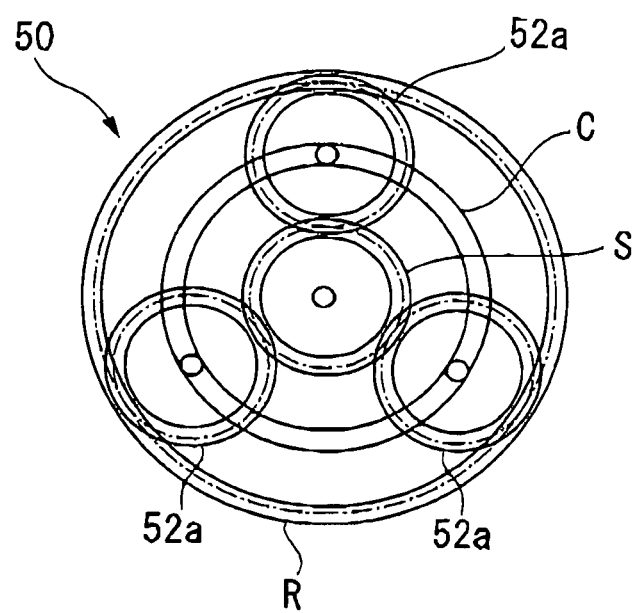
FIG. 2 is a schematic view illustrating a positional relationship of components of a planetary gear mechanism.

FIG. 2 is a schematic view illustrating a positional relationship of components of a planetary gear mechanism. The planetary gear mechanism 50 is configured such that a sun gear S on the inside, a ring gear R on the outside, and a carrier C therebetween are disposed on the same axis. Three pinion gears 52a are disposed between the sun gear S and the ring gear R so as to mesh with both the sun gear S and the ring gear R. The three pinion gears 52a are rotatably connected to the same carrier C.

The driving force combined by the planetary gear mechanism 50 is output to one pair of the front wheels and the rear wheels. In FIGS. 1A and 1B, the driving force from the planetary gear mechanism (P) 50 is output to the front wheels (Fr) 30 through a differential device (D) 31. As described below, a driving force generated from the engine (Eng) 10 is input to one of the sun gear S, the carrier C, and the ring gear R as components of the planetary gear mechanism 50, and a driving force generated from the motor (MOT) 20 is input to one of the components. The driving force combined by the planetary gear mechanism 50 is output from one of the components to the front wheels 30.

Additionally, an output generated from the engine 10 is output to the other pair of the front wheels and the rear wheels as well as the planetary gear mechanism 50. In FIGS. 1A and 1B, an output generated from the engine 10 is output to the rear wheels (Rr) 60 through a transmission mechanism (T/M) 40 and a differential device (D) 61.

As shown in FIG. 1A, an engine reverse rotation preventing mechanism such as an output shaft rotation braking unit (for braking a rotation of an output shaft) 12 or a one-way clutch (OWC) is provided adjacent to the engine 10. The engine reverse rotation preventing mechanism is disposed on a power transmission path of the engine 10 so as to be closer to the engine 10 than the planetary gear mechanism 50.

In addition, an auxiliary motor 14 is provided on the same axis as that of the engine 10. The auxiliary motor 14 is provided thereon so as to start the engine 10 and assist the output of the engine 10.

A brake (not shown) is provided so as to apply a braking force to the front wheels 30 and the rear wheels 60.

Then, an ECU (Electric Control Unit) 70 (controller) is provided so as to control operations of the engine 10, the motor 20, the output shaft rotation braking unit 12, the auxiliary motor 14, and the like.

[First Embodiment]

Figure 3A:
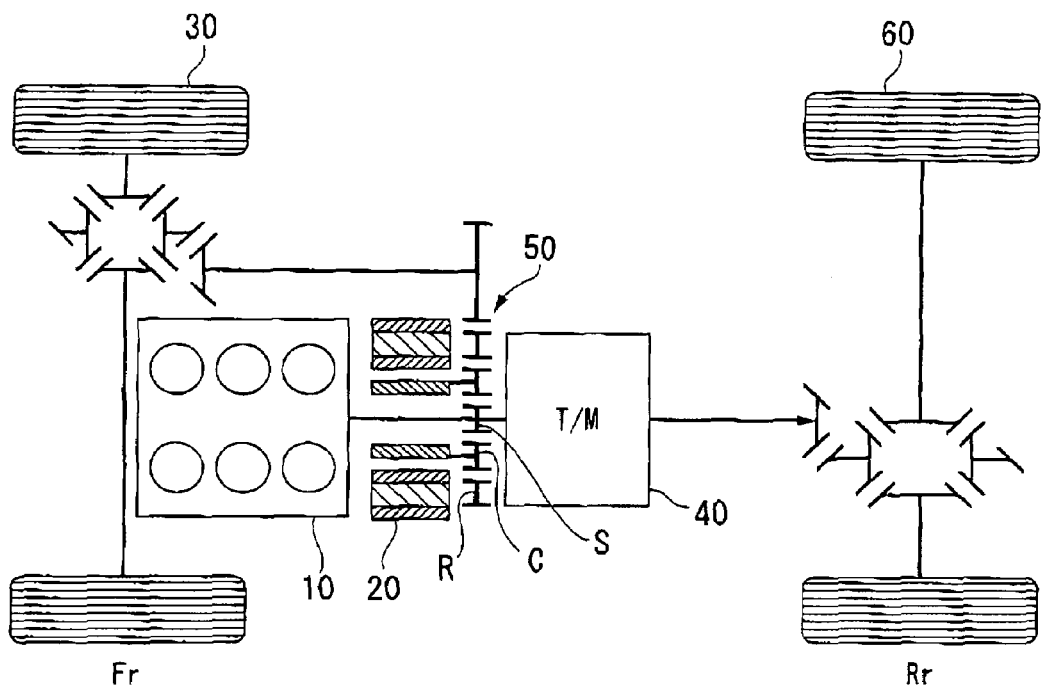
FIGS. 3A and 3B are explanatory views illustrating a structure of the driving device for the hybrid vehicle according to a first embodiment of the present invention.
Figure 3B:
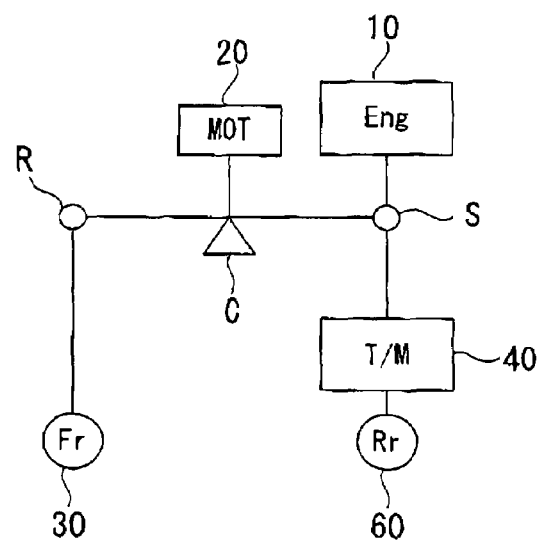

FIGS. 3A and 3B are explanatory views illustrating a structure of the driving device for the hybrid vehicle according to a first embodiment of the present invention, in which FIG. 3A is a schematic configuration diagram and FIG. 3B is a block diagram. In the first embodiment shown in FIGS. 3A and 3B, the output shaft of the motor 20 is connected to the carrier C of the planetary gear mechanism 50.

As shown in FIGS. 3A and 3B, a driving force generated from the engine 10 is input to the sun gear S of the planetary gear mechanism 50, and a driving force generated from the motor 20 is input to the carrier C thereof. The driving force combined by the planetary gear mechanism 50 is output from the ring gear R to the front wheels 30. In addition, a driving force generated from the engine 10 is input to the transmission mechanism 40 as well as the sun gear S, and then is output to the rear wheels 60.

FIGS. 4A to 4F are explanatory views illustrating an operation of the driving device for the hybrid vehicle according to the first embodiment of the present invention. In the respective drawings shown in FIGS. 4A to 4F, the components (the sun gear S, the carrier S, and the ring gear R) of the planetary gear mechanism 50 are shown in the horizontal axis, and the rpm of each component is shown in the vertical axis. In addition, each interval between the components shown in the horizontal axis indicates a gear ratio in the planetary gear mechanism 50.

Figure 4A:
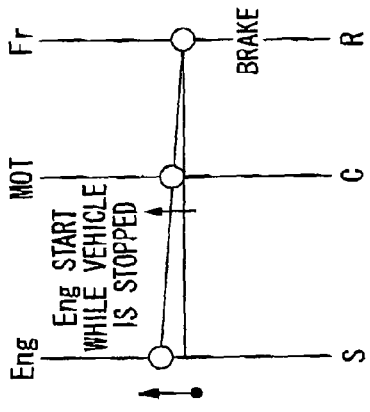
FIGS. 4A to 4F are explanatory views illustrating an operation of the driving device for the hybrid vehicle according to the embodiment.

FIG. 4A is a graph showing that the EV starting mode can be carried out. Specifically, the motor connected to the carrier C is made to rotate in a normal direction in a state in which the engine 10 connected to the sun gear S is stopped. Accordingly, the ring gear R is rotated to thereby output a driving force to the front wheels 30. In addition, the transmission mechanism 40 is set to a neutral mode so that the rear wheels 60 idly rotate. In order to prevent a following rotation of the engine 10, it is desirable to stop a rotation of the output shaft of the engine 10 by the output shaft rotation braking unit 12.

In this way, it is possible to start and drive the vehicle just by using the driving force generated from the motor 20 in the state that the engine 10 is stopped (EV starting mode and EV traveling mode). In general, fuel efficiency of the engine 10 upon starting the vehicle deteriorates, but it is possible to improve fuel efficiency in terms of the EV starting mode.

Figure 4B:
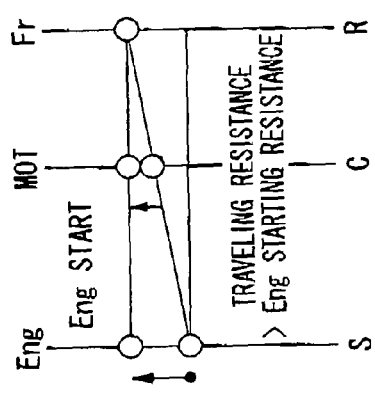

FIG. 4B is a graph showing that the engine can be started during the EV traveling mode. In FIG. 4B, the rpm of the motor 20 increases during the EV traveling mode shown in FIG. 4A. Here, when a force for rotating the engine 10 (engine starting resistance) is smaller than the force for rotating the front wheels 30 (traveling resistance), the driving force generated from the engine 20 can be used to start the engine 10 without outputting the driving force to the front wheels 30. By starting the engine 10 during the EV traveling mode, the EV traveling mode can be switched to the engine traveling mode, thereby improving fuel efficiency.

Figure 4C:
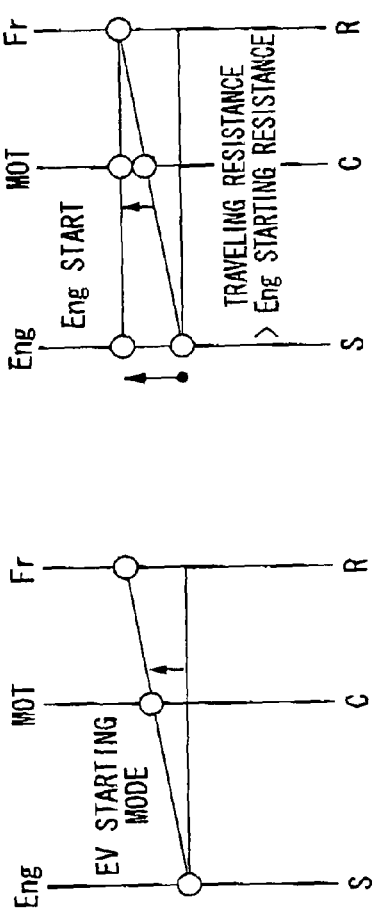

FIG. 4C is a graph showing that the engine can be started while the vehicle is stopped. When a braking force is applied from the brake to the front wheels 30, a force for rotating the front wheels 30 becomes smaller than a force for rotating the engine 10. Accordingly, a driving force generated from the motor 20 can be used to start the engine 10 without outputting the driving force to the front wheels 30.

In this way, when the engine can be started by the driving motor 20, the auxiliary motor for starting the engine is not necessary, and thus it is possible to reduce cost and save space. However, in order to start the engine even when the engine starting resistance is larger than the traveling resistance during the EV traveling mode, it is desirable to adopt the auxiliary motor for starting the engine.

Figure 4D:
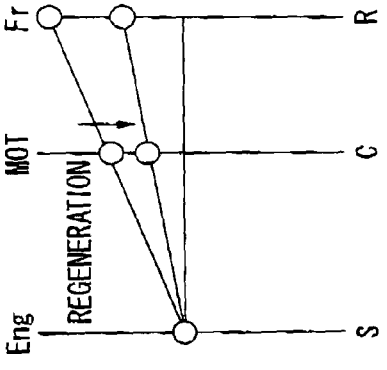

FIG. 4D is a graph showing that various traveling modes of the vehicle can be carried out. When the transmission mechanism 40 is set to the Top gear to carry out a constant-speed (cruise) traveling mode or the like, a driving force generated from the engine 10 is output to the front wheels 30 by maintaining the motor 20 to idly rotate or to output zero torque. Accordingly, it is possible to restrict the power consumption of the motor 20, thereby improving fuel efficiency. Additionally, when the transmission mechanism 40 is set to the Low gear to climb a slope, the rpm of the engine 10 is increased in order to obtain high torque, but the rpm of the motor 20 is decreased. When the transmission mechanism 40 is set to the Rev. (reverse) gear to travel backward, on the other hand, the rpm of the motor 20 is further decreased. In this way, a driving force of high torque generated from the engine 10 is output to the front wheels 30 and the rear wheels 60 to thereby carry out various traveling modes.

Figure 4E:
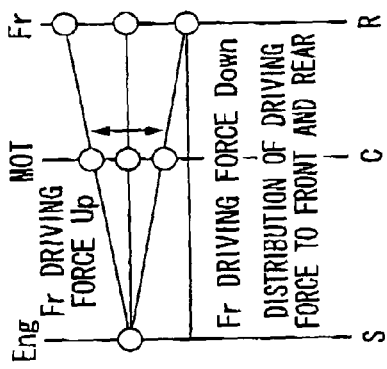

FIG. 4E is a graph showing that a driving force generated from the engine can be freely distributed to the front wheels and the rear wheel. When the rpm of the motor 20 is increased in a state in which the rpm of the engine 10 is fixed, it is possible to increase a driving force output to the front wheels 30. Additionally, when the rpm of the motor 20 is decreased, it is possible to decrease a driving force output to the front wheels 30.

Figure 4F:
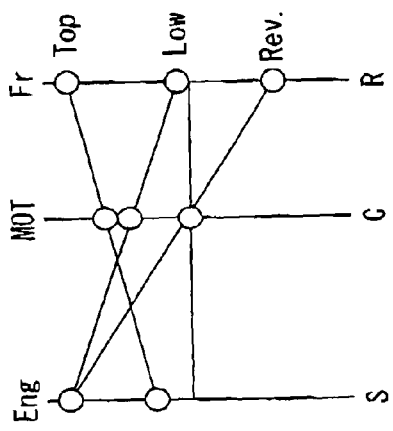

FIG. 4F is a graph showing that an electric power regeneration can be carried out by the motor. Specifically, the regeneration is performed by stopping the engine 10 and rotating the motor 20 with the rotation of the front wheels 30 during a deceleration of the vehicle. In addition, in order to prevent the following rotation of the engine 10, it is desirable to stop the rotation of the output shaft of the engine 10 by the output shaft rotation braking unit 12. In order to allow the rear wheels 60 to idly rotate, the transmission mechanism 40 is set to a neutral mode. Accordingly, it is possible to recharge a battery by outputting a regeneration power generated from the motor 20, thereby improving fuel efficiency.

[Variant Example]

Figure 5A:
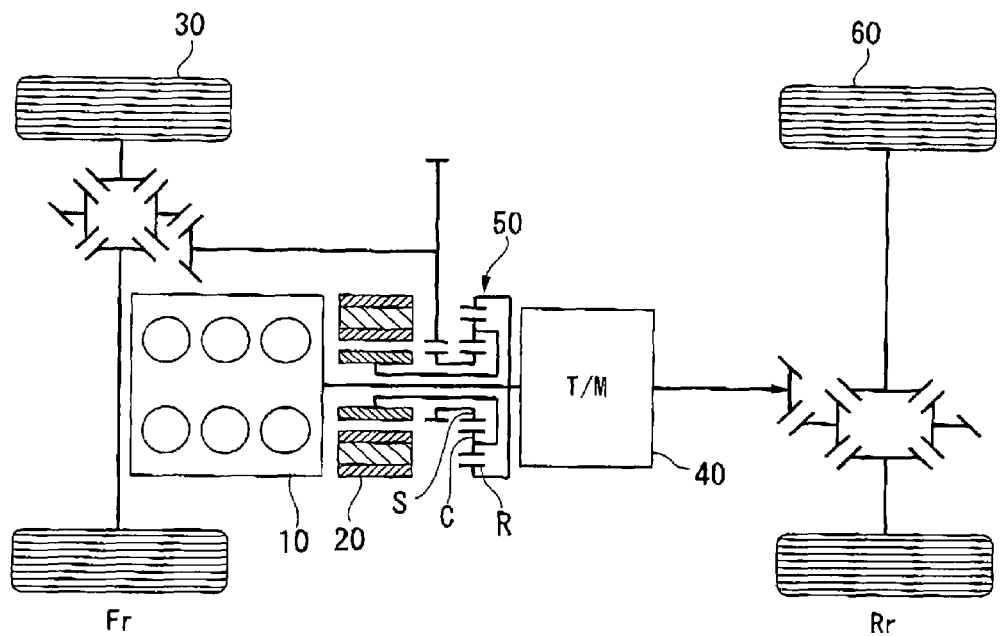
FIGS. 5A and 5B are explanatory views illustrating a structure of the driving device for the hybrid vehicle according to a variant example of the embodiment.
Figure 5B:
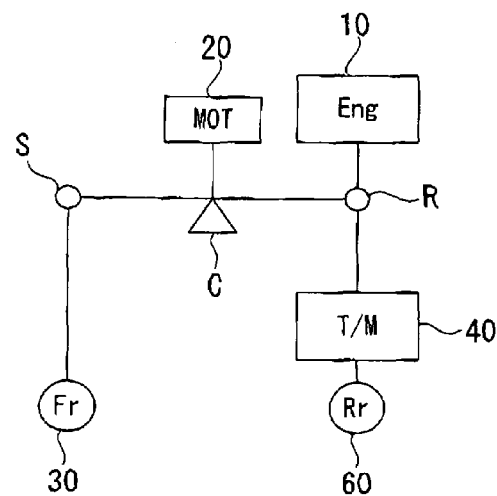
Figure 6C:
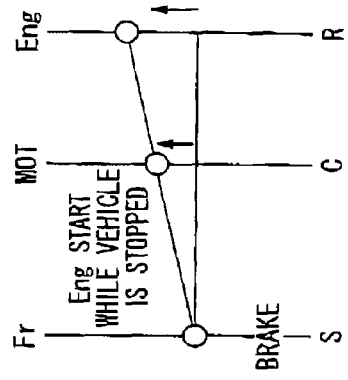
FIGS. 6A to 6F are explanatory views illustrating an operation of the driving device for the hybrid vehicle according to the variant example.
Figure 6B:
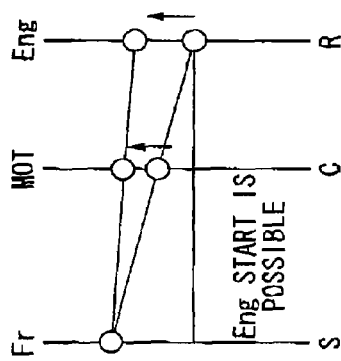
Figure 6A:
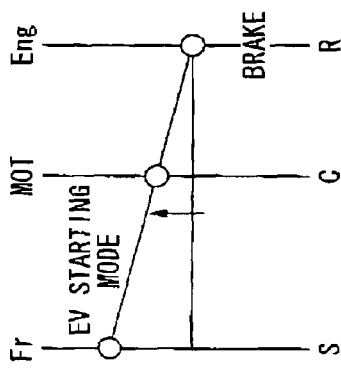
Figure 6F:
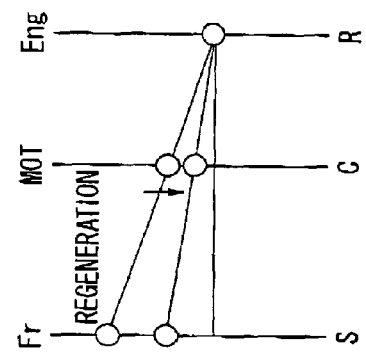
Figure 6E:
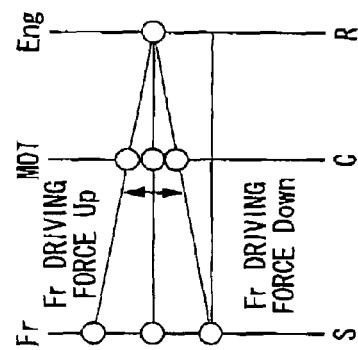
Figure 6D:
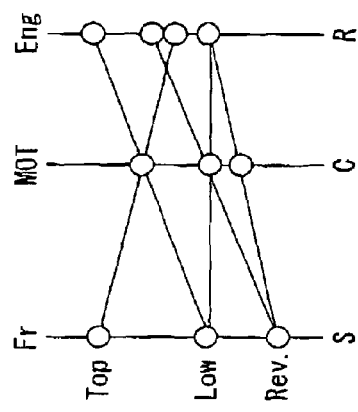

FIGS. 5A and 5B are explanatory views illustrating a structure of the driving device for the hybrid vehicle according to a variant example of the first embodiment of the present invention, in which FIG. 5A is a schematic configuration diagram and FIG. 5B is a block diagram. A specific description of the part having the same configuration as that of the above first embodiment will be omitted.

In this variant example, a driving force generated from the motor 20 is input to the carrier C of the planetary gear mechanism 50 in the same manner as the first embodiment. However, the first embodiment has a configuration in which a driving force generated from the engine 10 is input to the sun gear S, but this variant example has a configuration in which the driving force is input to the ring gear R. In addition, the first embodiment has a configuration in which the combined driving force is output from the ring gear R to the front wheels 30, but this variant example has a configuration in which the combined driving force is output from the sun gear S. That is, this variant example has a configuration in which a gear ratio of the sun gear S and the ring gear R in the planetary gear mechanism 50 according to the first embodiment is inverted.

FIGS. 6A to 6F are explanatory views illustrating an operation of the driving device for the hybrid vehicle according to the variant example of the first embodiment. The respective drawings of FIGS. 6A to 6F illustrate the same operations shown in the drawings of FIGS. 4A to 4F. In this variant example having the configuration in which the gear ratio of the planetary gear mechanism 50 according to the first embodiment is inverted, it is possible to carry out the same operations as those of the first embodiment.

The driving device for the hybrid vehicle which has been specifically described above includes: the planetary gear mechanism 50 which is disposed between the front wheels 30 and both the engine 10 and the motor 20; and the transmission mechanism 40 which is disposed between the engine 10 and the rear wheels 60.

With such a configuration, since there is provided the planetary gear mechanism 50 which is disposed between the front wheels 30 and both the engine 10 and the motor 20, it is possible to carry out the constant-speed (cruise) traveling mode just by outputting the driving force generated from the engine 10 to the front wheels 30 without outputting the driving force from the motor 20 as described in FIG. 4D. Also, since the transmission mechanism 40 which is disposed between the rear wheels 60 and the engine 10 is provided, the motor 20 is not necessary to be driven for the transmission operation. Accordingly, it is possible to reduce the power consumption of the motor 20, thereby improving fuel efficiency.

Furthermore, as described in FIG. 4A, it is possible to allow the vehicle to start and travel just by using the driving force generated from the motor 20 in a state in which the engine 10 is stopped (EV starting mode and EV traveling mode), thereby improving fuel efficiency.

Conventionally, a hybrid system for a front engine/rear wheel drive vehicle adopted two or more motors as well as the engine as driving sources. Accordingly, it was necessary to prepare two or more inverters (PDU) for driving the motors. For this reason, the hybrid system was expensive and was not able to be used for a package of the vehicle.

On the other hand, since the driving device for the hybrid vehicle according to the present invention adopts only one motor and the engine, one inverter can sufficiently drive the motor, thereby reducing cost and saving space. In addition, since the motor is connected as described above, it is possible to obtain various advantages described above as well as the known hybrid function.

The driving device for the hybrid vehicle according to the first embodiment and the variant example has a configuration in which the output shaft of the motor 20 is connected to the carrier C of the planetary gear mechanism 50.

With such a configuration, as described in FIG. 4B, it is possible to start the engine 10 by increasing the rpm of the motor 20 connected to the carrier C while the EV traveling mode is carried out just by using a driving force generated from the motor 20. Accordingly, the EV traveling mode can be switched to the engine traveling mode, thereby improving fuel efficiency.

As described in FIG. 4D, it is possible to carry out various traveling modes such as the traveling mode which climbs the slope in a state in which the transmission mechanism 40 is set to the Low gear or the backward traveling mode which travels backward in a state in which the transmission gear 40 is set to the Rev gear.

[Second Embodiment]

Figure 7A:
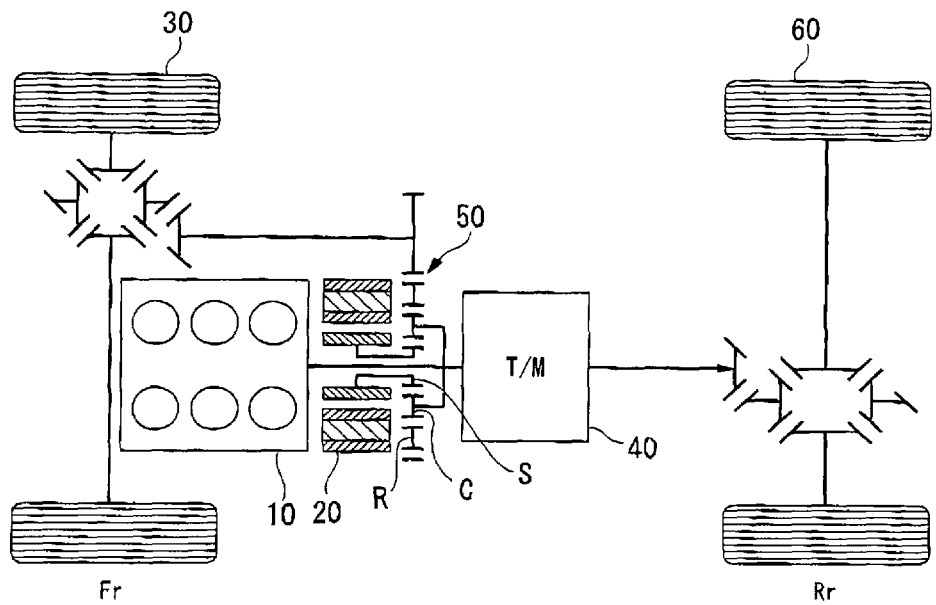
FIGS. 7A and 7B are explanatory views illustrating a structure of the driving device for the hybrid vehicle according to a second embodiment of the present invention.
Figure 7B:
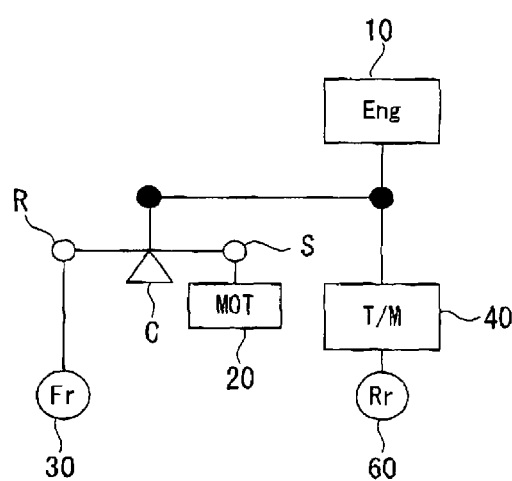

FIGS. 7A and 7B are explanatory views illustrating a structure of the driving device for the hybrid vehicle according to a second embodiment of the present invention, in which FIG. 7A is a schematic view and FIG. 7B is a block diagram. In the second embodiment shown in FIGS. 7A and 7B, the output shaft of the engine 10 is connected to the carrier C of the planetary gear mechanism 50. In addition, a specific description of a part having the same configuration as that of the above first embodiment will be omitted.

As shown in FIGS. 7A and 7B, a driving force generated from the motor 20 is input to the sun gear S of the planetary gear mechanism 50, and a driving force generated from the engine 10 is input to the carrier C thereof. The driving force combined by the planetary gear mechanism 50 is configured to be output from the ring gear R to the front wheels 30. In addition, the driving force generated from the engine 10 is input to the transmission mechanism 40 as well as the carrier C, and then is output to the rear wheels 60.

FIGS. 8A to 8F are explanatory views illustrating an operation of the driving device for the hybrid vehicle according to the second embodiment of the present invention.

Figure 8C:
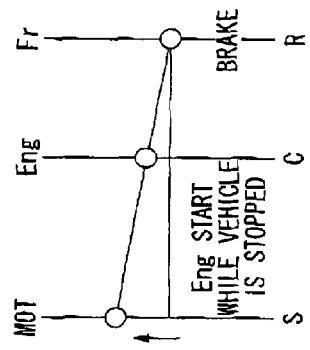
FIGS. 8A to 8F are explanatory views illustrating an operation of the driving device for the hybrid vehicle according to the embodiment.
Figure 8B:
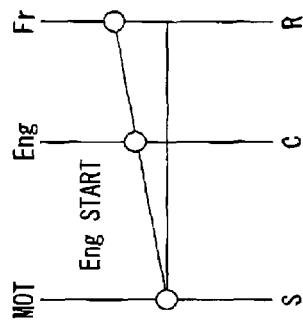
Figure 8A:
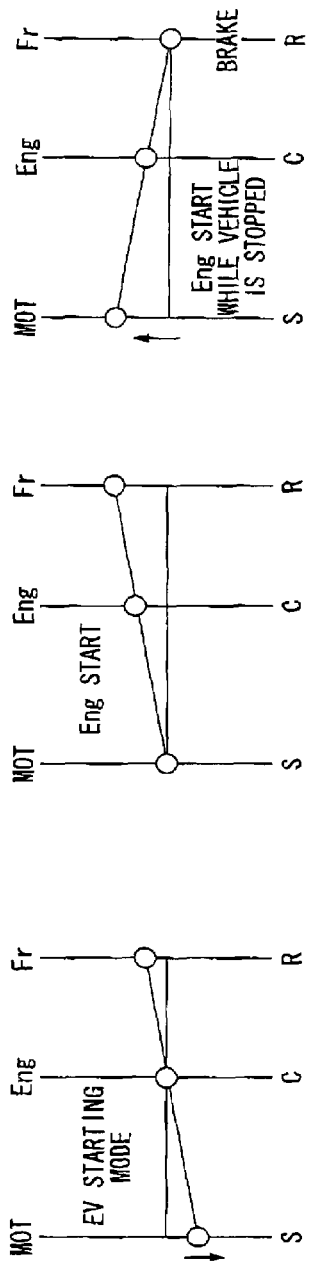

FIG. 8A is a graph showing that the EV starting mode can be carried out. Specifically, the motor connected to the sun gear S is made to rotate in a reverse direction in a state in which the engine 10 connected to the sun carrier C is stopped. Accordingly, the ring gear R is rotated to thereby output the driving force to the front wheels 30. As a result, it is possible to carry out the EV starting mode and the EV traveling mode.

FIG. 8B is a graph showing that the engine is started during the EV traveling mode. In order to start the engine 10 during the EV traveling mode shown in FIG. 8A, it is necessary to invert the motor 20 which is rotated in the normal direction. For this reason, it is difficult to start the engine during the EV traveling mode, and thus it is desirable to adopt the auxiliary motor.

FIG. 8C is a graph showing that the engine can be started while the vehicle is stopped. It is possible to start the engine 10 by rotating the motor 20 in a normal direction in a state in which a braking force is applied to the front wheels 30.

Figure 8F:
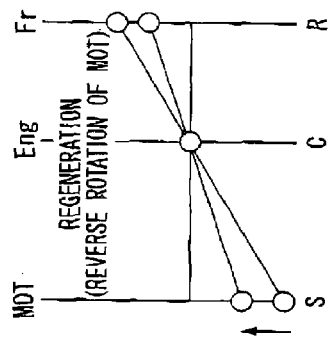
Figure 8E:
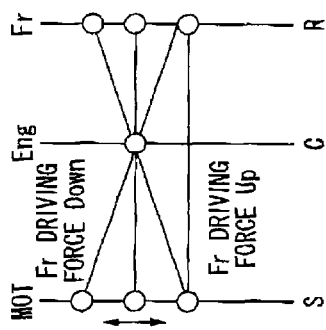
Figure 8D:
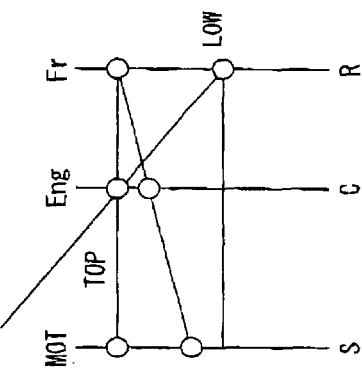

FIG. 8D is a graph showing that various traveling modes of the vehicle can be carried out. When the transmission mechanism 40 is set to the Top gear to carry out a constant-speed (cruise) traveling mode or the like, a driving force generated from the engine 10 is output to the front wheels 30 by maintaining the motor 20 to idly rotate or to output zero torque.

Meanwhile, when the transmission mechanism 40 is set to the Low gear to climb a slope or when the transmission mechanism 40 is set to the Rev. (reverse) gear to travel backward, a high rpm of the engine 10 is maintained in order to obtain high torque. In this case, the motor 20 rotates at a very high speed.

FIG. 8E is a graph showing that a driving force generated from the engine can be freely distributed to the front wheels and the rear wheels. In the second embodiment, it is possible to broadly distribute the driving force to the front wheels and the rear wheels by increasing or decreasing the rpm of the motor 20 connected to the sun gear S in a state in which the rpm of the engine 10 connected to the carrier C is maintained. In addition, it is possible to easily increase or decrease the driving force distributed to the front wheels 30 without generating large torque from the motor 20 even though an increase/decrease amount of the rpm of the motor 20 becomes larger.

FIG. 8F is a graph showing that an electric power regeneration can be carried out by the motor. Specifically, the regeneration electric power can be output from the motor 20 by stopping the engine 10 and rotating the motor 20 with the rotation of the front wheels 30 during a deceleration of the vehicle. However, in order to allow the traveling mode in the Top gear shown in FIG. 8D to be switched to the electric power regeneration shown in FIG. 8F, it is necessary to invert the rotation direction of the motor 20.

[Variant Example]

Figure 9A:
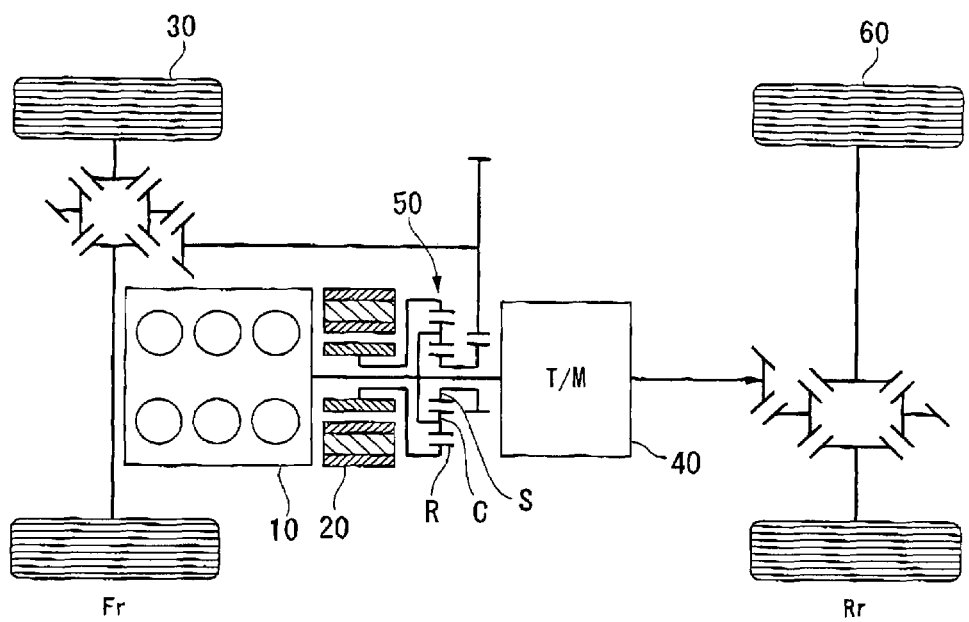
FIGS. 9A and 9B are explanatory views illustrating an operation of the driving device for the hybrid vehicle according to a variant example of the embodiment.
Figure 9B:
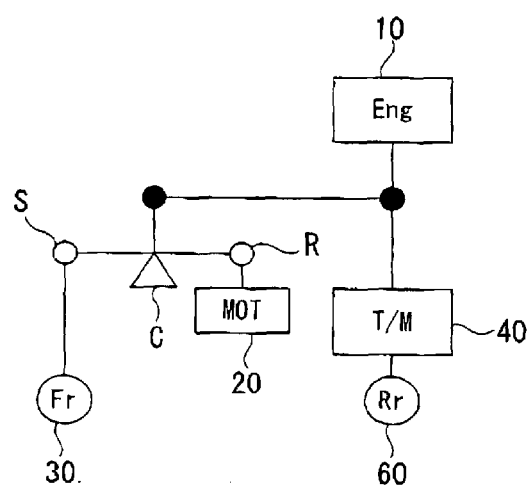
Figure 10A:
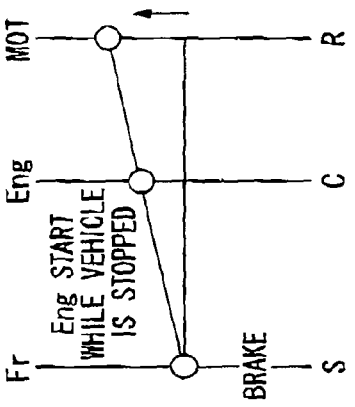
FIGS. 10A to 10F are explanatory views illustrating an operation of the driving device for the hybrid vehicle according to the variant example.
Figure 10B:
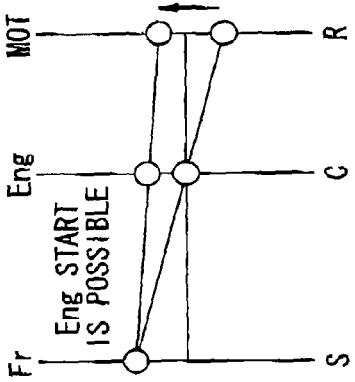
Figure 10C:
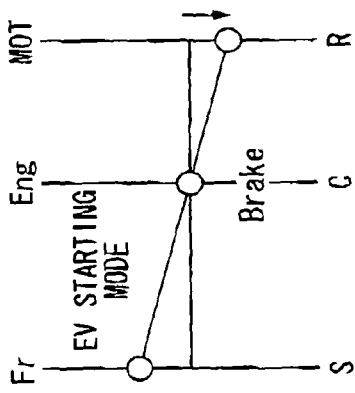
Figure 10D:
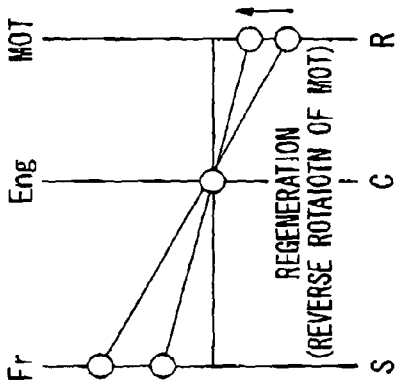
Figure 10E:
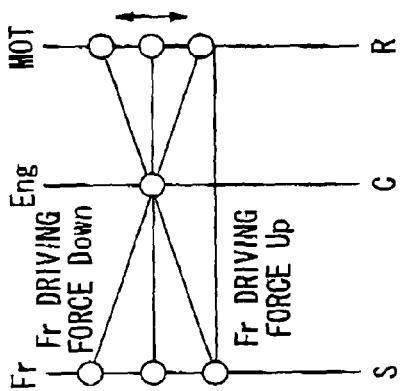
Figure 10F:
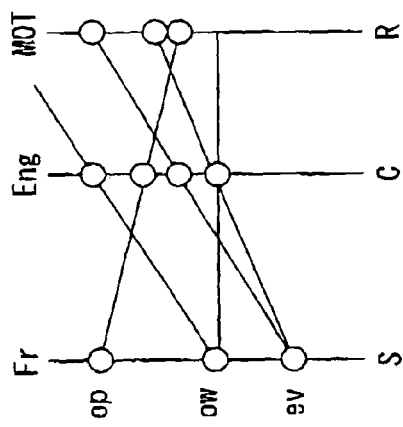

FIGS. 9A and 9B are explanatory views illustrating an operation of the driving device for the hybrid vehicle according to a variant example of the second embodiment of the present invention, in which FIG. 9A is a schematic view and FIG. 9B is a block diagram. A specific description of a part having the same configuration as that of the above-described embodiment will be omitted.

In this variant example, in the same manner as the second embodiment, a driving force generated from the engine 10 is input to the carrier C of the planetary gear mechanism 50. However, the second embodiment has a configuration in which a driving force generated from the motor 20 is input to the sun gear S, but this variant example has a configuration in which the driving force is input to the ring gear R. In addition, the second embodiment has a configuration in which the combined driving force is output from the ring gear R to the front wheels 30, but this variant example has a configuration in which the combined driving force is output from the sun gear S. That is, this variant example has a configuration in which a gear ratio of the sun gear S and the ring gear R in the planetary gear mechanism 50 according to the second embodiment is inverted.

FIGS. 10A to 10F are explanatory views illustrating an operation of the driving device for the hybrid vehicle according to the variant example of the second embodiment. The respective drawings of FIGS. 10A to 10F illustrate the operations shown in the drawings of FIGS. 8A to 8F. In this variant example having the configuration in which the gear ratio of the planetary gear mechanism 50 according to the second embodiment is inverted, it is possible to carry out the same operations as those of the second embodiment.

As specifically described above, the driving device for the hybrid vehicle according to the second embodiment and the variant example has a configuration in which the output shaft of the engine 10 is connected to the carrier C of the planetary gear mechanism 50.

With such a configuration, it is possible to broadly distribute a driving force to the front wheels and the rear wheels by increasing or decreasing the rpm of the motor 20 in a state in which the rpm of the engine 10 connected to the carrier C is maintained.

[Third Embodiment]

Figure 11A:
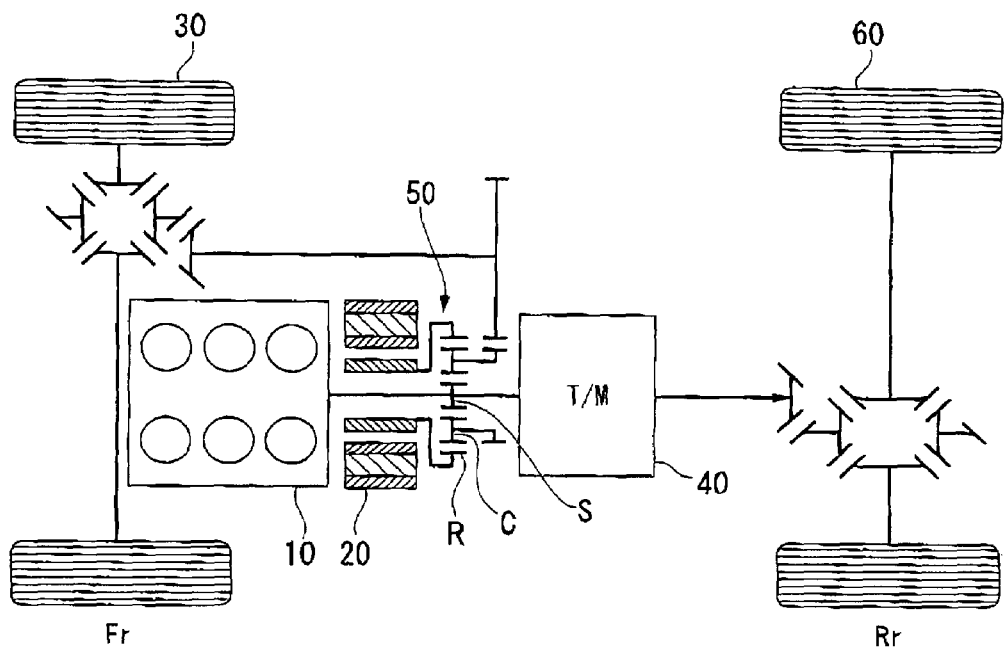
FIGS. 11A and 11B are explanatory views illustrating a structure of the driving device for the hybrid vehicle according to a third embodiment of the present invention.
Figure 11B:
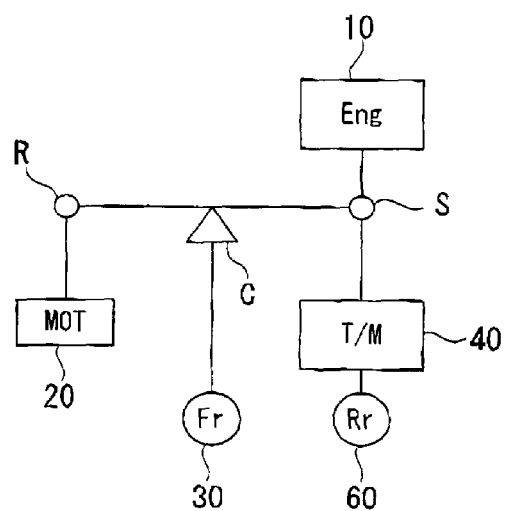

FIGS. 11A and 11B are explanatory views illustrating a structure of the driving device for the hybrid vehicle according to a third embodiment of the present invention, in which FIG. 11A is a schematic configuration diagram and FIG. 11B is a block diagram. In the third embodiment shown in FIGS. 11A and 11B, the input shaft of the front wheels 30 is connected to the carrier C of the planetary gear mechanism 50. In addition, a specific description of a part having the same configuration as that of the first embodiment will be omitted.

As shown in FIGS. 11A and 11B, the driving force generated from the engine 10 is input to the sun gear S of the planetary gear mechanism 50 and the driving force generated from the motor 20 is input to the ring gear R. The driving force combined by the planetary gear mechanism 50 is output from the carrier C to the front wheels 30. In addition, a driving force generated from the engine 10 is input to the transmission mechanism 40 and the sun gear S, and then is output to the rear wheels 60.

FIGS. 12A to 12F are explanatory views illustrating an operation of the driving device for the hybrid vehicle according to the third embodiment of the present invention.

Figure 12A:
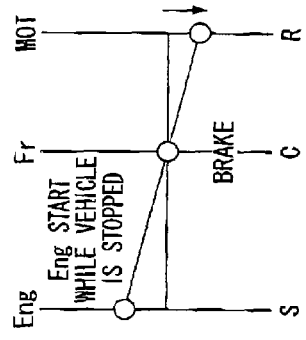
FIGS. 12A to 12F are explanatory views illustrating an operation of the driving device for the hybrid vehicle according to the embodiment.

FIG. 12A is a graph showing that the EV starting mode can be carried out. Specifically, the motor connected to the ring gear R is made to rotate in a normal direction in a state in which the engine 10 connected to the sun gear S is stopped. Accordingly, the carrier C is rotated to thereby output a driving force to the front wheels 30. As a result, it is possible to carry out the EV starting mode and the EV traveling mode.

Figure 12B:
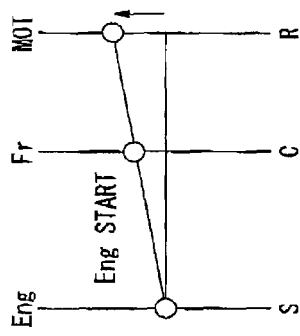

FIG. 12B is a graph showing that the engine is started during the EV traveling mode. Even when the rpm of the motor 20 connected to the ring gear R is increased during the EV traveling mode shown in FIG. 12A, it is not possible to immediately increase the rpm of the engine 10 connected to the sun gear S. For this reason, it is difficult to start the engine during the EV traveling mode, and thus it is desirable to adopt the auxiliary motor.

Figure 12C:
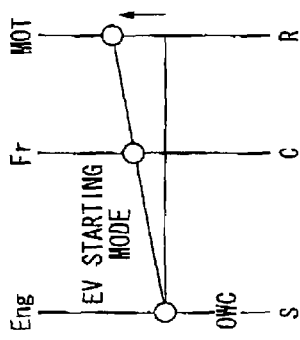

FIG. 12C is a graph showing that the engine can be started while the vehicle is stopped. It is possible to start the engine 10 by rotating the motor 20 in a reverse direction in a state in which a braking force is applied to the front wheels 30.

Figure 12D:
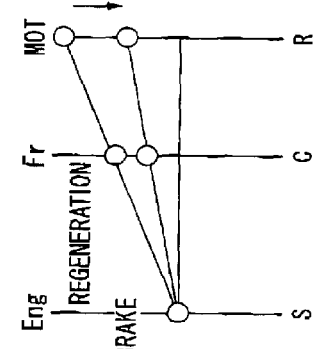

FIG. 12D is a graph showing that various traveling modes of the vehicle can be carried out. When the transmission mechanism 40 is set to the Top gear to carry out a constant-speed (cruise) traveling mode or the like, the high rpm of the front wheels 30 is maintained, and thus it is necessary to maintain the engine 10 or the motor 20 at the high rpm.

Meanwhile, when the transmission mechanism 40 is set to the Low gear to climb a slope, the rpm of the motor 20 is decreased, but the rpm of the engine 10 is increased in order to obtain a high torque. When the transmission mechanism 40 is set to the Rev. (reverse) gear to travel backward, the rpm of the motor 20 is further decreased.

Figure 12E:
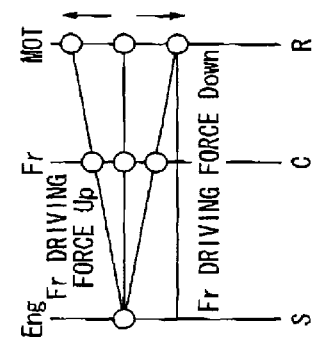

FIG. 12E is a graph showing that the driving force generated from the engine can be freely distributed to the front wheels and the rear wheel.

Figure 12F:
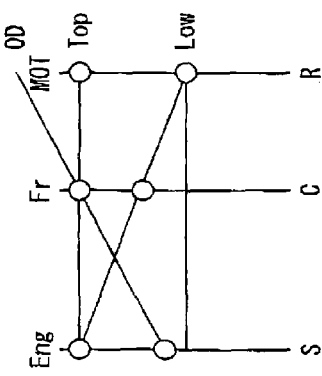

FIG. 12F is a graph showing that an electric power regeneration can be carried out by the motor. Specifically, the regeneration electric power can be output from the motor 20 by stopping the engine 10 and rotating the motor 20 with the rotation of the front wheels 30 during a deceleration of the vehicle.

[Variant Example]

Figure 13A:
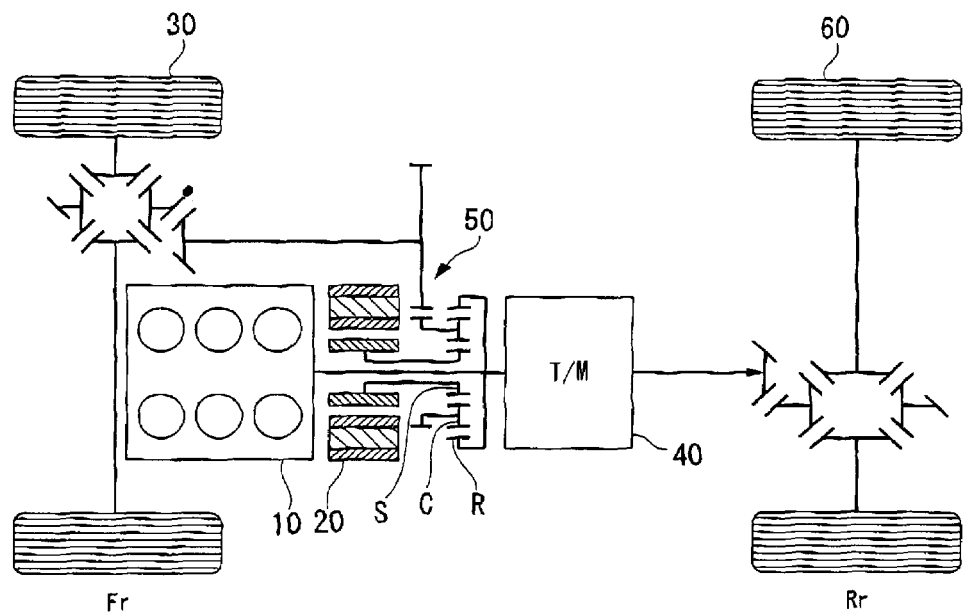
FIGS. 13A and 13B are explanatory views illustrating a structure of the driving device for the hybrid vehicle according to a variant example of the embodiment.
Figure 13B:
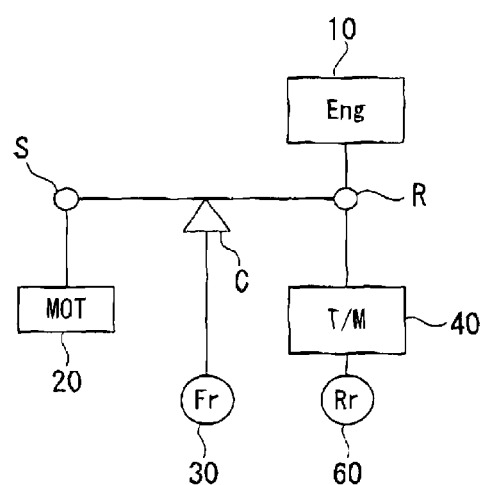
Figure 14C:
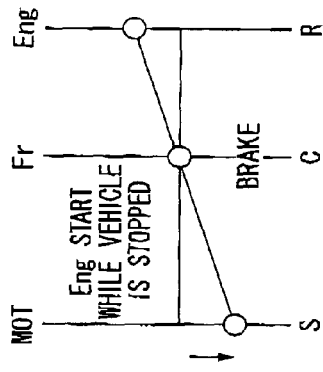
FIGS. 14A to 14F are explanatory views illustrating an operation of the driving device for the hybrid vehicle according to the variant example.
Figure 14B:
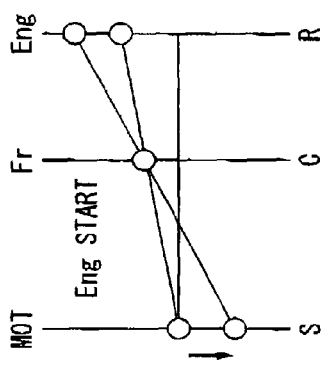
Figure 14A:
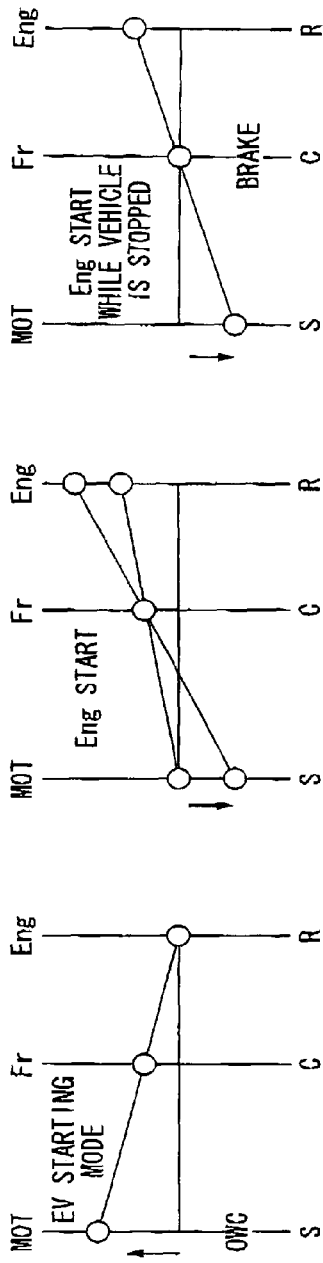
Figure 14F:
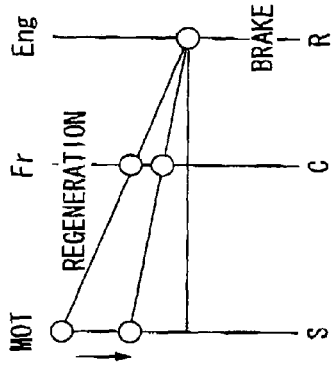
Figure 14E:
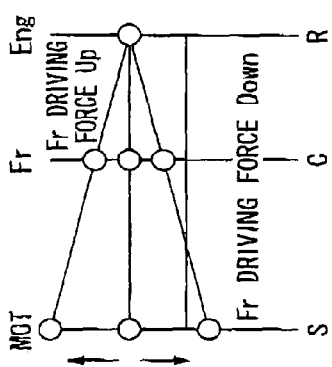
Figure 14D:
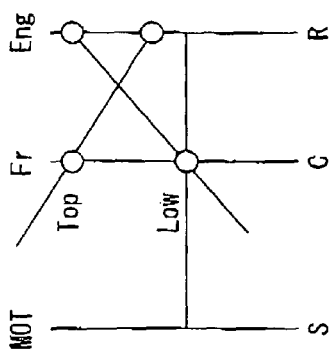
Figure 15A:
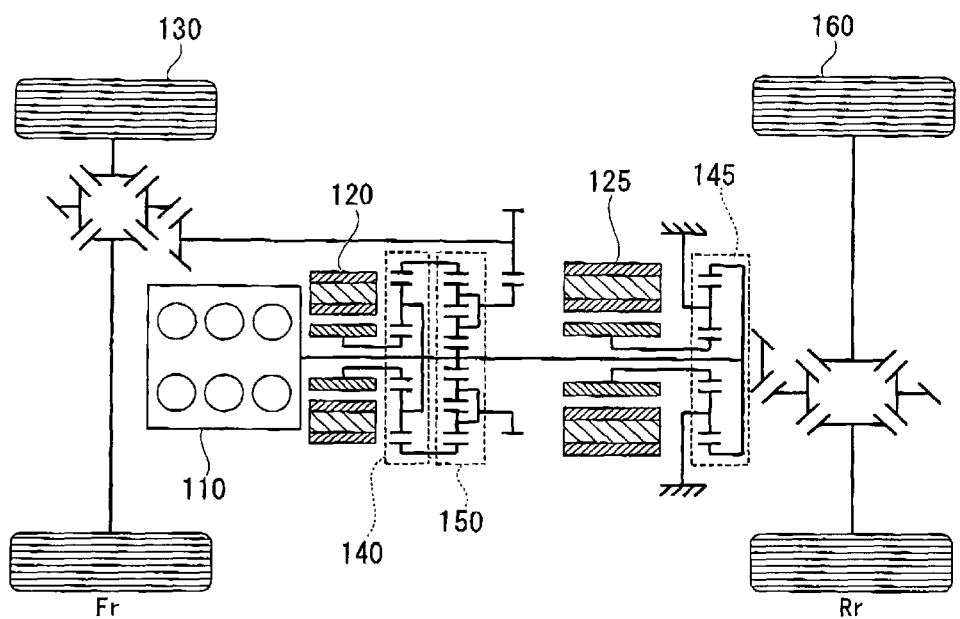
FIGS. 15A and 15B are explanatory views illustrating a structure of the driving device for the hybrid vehicle according to a known example.
Figure 15B:
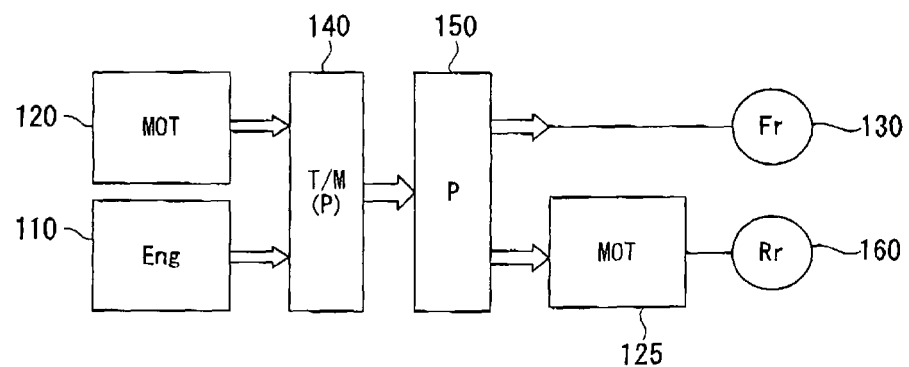

FIGS. 13A and 13B are explanatory views illustrating a structure of the driving device for the hybrid vehicle according to a variant example of the third embodiment of the present invention, in which FIG. 13A is a schematic configuration diagram and FIG. 13B is a block diagram. In addition, a specific description of a part having the same configuration as that of the above-described embodiment will be omitted.

In this variant example, in the same manner as the third embodiment, the combined driving force is output from the carrier C to the front wheels 30. However, the third embodiment has a configuration in which the driving force generated from the engine 10 is input to the sun gear S, but this variant example has a configuration in which the driving force is input to the ring gear R. Additionally, the third embodiment has a configuration in which the driving force generated from the motor 20 is input to the ring gear R, but this variant example has a configuration in which the driving force is output from the sun gear S. That is, this variant example has a configuration in which a gear ratio of the sun gear S and the ring gear R in the planetary gear mechanism 50 according to the third embodiment is inverted.

FIGS. 14A to 14F are explanatory views illustrating an operation of the driving device for the hybrid vehicle according to the variant example of the third embodiment. The respective drawings of FIGS. 14A to 14F illustrate the operations shown in the drawings of FIGS. 12A to 12F. In this variant example having the configuration in which the gear ratio in the planetary gear mechanism 50 according to the third embodiment is inverted, it is possible to carry out the same operations as those of the third embodiment.

As specifically described above, the driving device for the hybrid vehicle according to the third embodiment and the variant example has a configuration in which the input shaft of the front wheels 30 is connected to the carrier C of the planetary gear mechanism 50.

When the driving force combined by the planetary gear mechanism 50 is output to the front wheels 30, it is difficult to output the driving force from the ring gear R having teeth formed in the inner surface thereof. On the contrary, according to the third embodiment and the variant example thereof, it is possible to output the driving force from the carrier C to the front wheels 30 in a simple manner.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

For instance, since the preferred embodiments have a configuration in which the planetary gear mechanism is disposed between both the engine and the motor and the front wheels, and the transmission mechanism is disposed between the engine and the rear wheels, the present invention may also have a configuration in which the planetary gear mechanism is disposed between the engine and the rear wheels, and the transmission mechanism is disposed between the engine and the front wheels.

What is claimed is:

1. A driving device for a hybrid vehicle comprising:
   an engine;
   an electric motor;
   a power combination/distribution mechanism which is operatively coupled with both the engine and the electric motor and one of a pair of front wheels or rear wheels so as to combine and distribute power generated from the engine and the electric motor;
   a transmission mechanism which is operatively coupled with the engine and the other of the pair of front wheels or rear wheels;
   an engine reverse rotation preventing mechanism which is disposed on a power transmission path of the engine so as to be closer to the engine than the power combination/distribution mechanism; and
   a controller which controls an operation of the vehicle, wherein:
      the power combination/distribution mechanism is a planetary gear mechanism having a sun gear, a carrier, and a ring gear;
      an output shaft of the electric motor is connected to the carrier;
      rotational driving ranges in the electric motor are set to each of a normal rotation direction and a reverse rotation direction;
      an output shaft of the engine is connected to the sun gear or the ring gear of the planetary gear mechanism;
      the engine reverse rotation preventing mechanism is an output shaft rotation braking unit which stops a rotation of the output shaft of the engine; and
      the controller, when carrying out an electric power regeneration by the electric motor, stops a rotation of the output shaft of the engine by the output shaft rotation braking unit and sets the transmission mechanism to a neutral mode.

2. The driving device for the hybrid vehicle according to claim 1, wherein the engine and the electric motor are disposed on the same axis.

3. The driving device for the hybrid vehicle according to claim 1, wherein the controller controls the engine to be stopped and then controls the electric motor to generate a driving force so as to perform an electrically-driven travel operation of the vehicle.

4. The driving device for the hybrid vehicle according to claim 1, further comprising a second electric motor which is disposed on the output shaft of the engine and is operatively coupled with the engine and the power combination/distribution mechanism so as to assist an output of the engine or to start the engine.

5. The driving device for the hybrid vehicle according to claim 1, further comprising:
   a vehicle braking unit which is provided in the front wheels and the rear wheels, respectively, wherein
   the controller controls the vehicle braking unit to apply a braking force to the front wheels and the rear wheels while the vehicle is stopped, and then controls the electric motor to increase an rpm of the engine so as to start the engine.

6. The driving device for the hybrid vehicle according to claim 1, wherein
   the controller controls the electric motor to be stopped or to output zero torque and outputs a driving force generated from the engine to said other pair of the front wheels and the rear wheels through the transmission mechanism while the vehicle travels at a constant speed.

7. The driving device for the hybrid vehicle according to claim 3, wherein the controller controls the electric motor to increase an rpm of the engine to a predetermined value or more to start the engine, in a case that a traveling resistance in rotating said one pair of the front wheels and the rear wheels with the electric motor through the power combination/distribution mechanism during the electrically-driven travel operation of the vehicle is larger than a starting resistance in starting the engine with the electric motor.

8. The driving device for the hybrid vehicle according to claim 3, further comprising an output shaft rotation braking unit which stops a rotation of an output shaft of the engine, wherein the controller controls the output shaft rotation braking unit to stop the rotation of the output shaft of the engine during the electrically-driven travel of the vehicle.

* * * * *